Patented Dec. 26, 1950

2,535,524

UNITED STATES PATENT OFFICE 2,535,524

VULCANIZABLE RUBBER COMPOSITION

Ervin R. Williams, Cuyahoga Falls, Ohio, assignor to Harrison & Morton Laboratories, Inc., Cuyahoga Falls, Ohio, a corporation of Ohio No Drawing. Application June 1, 1948,
Serial No. 30,509

11 Claims. (Cl. 260—782)

My invention relates to the vulcanization of rubber and rubber-like compounds and more particularly to the use of ingredients for promoting or activating the action of organic accelerators.

The object of the invention is to provide a class of materials which may be manufactured at low cost and which when incorporated into an accelerated rubber stock, tend to promote the curing characteristics of the rubber stock to a remarkable degree.

It has been known to the prior art that the alkaline metal salts of aliphatic monobasic acids function as activators of organic accelerators; such materials were described in U. S. Patents 1,893,868 and 1,893,869 issued to Morton January 10, 1933.

I have discovered that the alkaline metal salts of a mixture of aliphatic and resin acids, when added to a rubber stock, having incorporated therein an organic accelerator, tend to promote the vulcanization of rubber to a greater degree than previously known materials.

This remarkable result is dependent upon the two different acids being mixed prior to the formation of the alkaline metal salt and the reaction is not completely understood. If the alkaline metal salts of the two different acids are separately prepared and then mechanically mixed, the unique effect is not produced.

The process of this invention therefore, consists in forming the alkaline metal salt from a mixture of organic acids, at least one of which is a resin acid and the others are aliphatic or fatty acids.

A typical resin acid as described in this application is known as abietic acid and is an aromatic acid containing several carbocyclic rings, the chemical constitution has been suggested as follows:

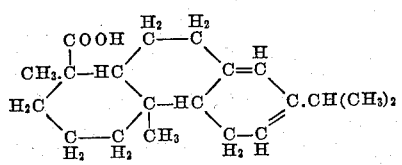

It has been found that when a mixture of such aliphatic and resin acids is reacted with sodium or potassium hydroxide so as to form the alkali metal salts, the composition is far more active than either alkaline metal salt alone and beyond the mere additive effect of the two salts; the activating characteristics of such a composition is markedly intensified and to an unexpected degree.

The preferred method of carrying out the invention is to employ the sodium salt of the mixed acids wherein the mixed acid is not completely neutralized. The process, however, is not restricted to this preferred method and the mixture of acids may be completely neutralized.

Where the term "sodium salt" is used in this specification and appended claims, it is intended to include as an equivalent "potassium salt" or like alkaline metals.

Among the activators contemplated by me may be mentioned the sodium or potassium salts of the following acid mixtures:

| Aliphatic Acid | + | Resin Acid |
|---|---|---|
| ($CH_3COOH$) Acetic Acid | | Abietic Acid ($C_{20}H_{30}O_2$) |
| ($C_{17}H_{33}COOH$) Oleic Acid | | Abietic Acid |
| ($C_7H_{15}COOH$) Ethyl Hexoic Acid | | Do. |
| ($C_{17}H_{25}COOH$) Stearic Acid | | Pimaric Acid ($C_{20}H_{30}O_2$) |
| ($C_{11}H_{23}COOH$) Lauric Acid | | Abietic Acid |
| ($C_{15}H_{31}COOH$) Palmitic Acid | | Pimaric Acid |
| Oleic Acid+Stearic Acid | | Abietic Acid |
| Oleic Acid+Lauric Acid | | Do. |
| Ethyl Hexoic+Oleic Acid+Lauric Acid | | Abietic Acid+Pimaric Acid |
| $HOCH_2COOH$, Glycolic Acid | | Abietic Acid |
| $HOOC(CH_2)_4COOH$, Adipic Acid | | Do. |
| $HOOC.CH:CH.COOH$, Maleic Acid | | Do. |
| $HOOCCH_2C(OH)(COOH)CH_2COOH$, Citric Acid | | Do. |

The above materials serve to indicate the scope of the invention but the invention is not limited by the specific examples, as many other sodium or potassium salts of such mixed acids function in like manner. The mixture of acids may contain any number of different aliphatic fatty acids and the only limiting factor is that at least one of the other acids shall be an aromatic acid preferably of the resin acid type. Isomeric acids may be used.

The process of this invention is practiced advantageously in conjunction with organic accelerators such as aldehyde-amines; primary, secondary and diamines; thiuram monosulphides and disulphides, mercapto benzo thiazoles; diaryl guanidines; dithio carbamates; benzothiazyl disulphide and many other materials of similar function.

The following examples serve to indicate appropriate vulcanizing temperatures and times for properly vulcanizing tensil strength test slabs of approximately 1/16 inch in thickness.

Cure represents time in minutes at the indicated steam pressure.

EXAMPLE I

This example serves to demonstrate the use of the sodium salt prepared from a mixture of oleic and abietic acid.

The material was prepared by treating a mixture of 1 mol of abietic acid and 1 mol of oleic acid with 1 mol of sodium hydroxide.

The following stocks were mixed, calendered, and cured:

| Material | A | B | C | D |
|---|---|---|---|---|
| Rubber | 100 | 100 | 100 | 100 |
| Zinc Oxide | 10 | 10 | 10 | 10 |
| Sulphur | 3 | 3 | 3 | 3 |
| Alpha ethyl Beta Propyl Acryl Aniline | 0.5 | 0.5 | 0.5 | 0.5 |
| Stearic Acid | 1 | | 2 | |
| Sodium Salt of Mixture of Abietic Acid and Oleic Acid as prepared above | | 1 | | 2 |

On testing the cured slabs, the following tensil strength results were obtained. The cures were carried out at 60 lbs. per square inch steam pressure (307° F.).

| Cure | Stock A | | | Stock B | | | Stock C | | | Stock D | | |
|---|---|---|---|---|---|---|---|---|---|---|---|---|
| | T | E | M | T | E | M | T | E | M | T | E | M |
| 5x60# | 1,275 | 880 | 335 | 1,985 | 760 | 810 | 1,155 | 800 | 430 | 2,025 | 760 | 825 |
| 10x60# | 1,880 | 770 | 700 | 2,630 | 730 | 1,355 | 1,945 | 770 | 775 | 2,545 | 710 | 1,395 |
| 15x60# | 2,325 | 710 | 1,220 | 3,005 | 700 | 1,810 | 2,530 | 720 | 1,270 | 3,255 | 700 | 1,860 |
| 20x60# | 2,630 | 700 | 1,580 | 3,470 | 700 | 1,930 | 2,795 | 700 | 1,655 | 3,335 | 700 | 2,045 |
| 25x60# | 2,740 | 680 | 1,735 | 3,390 | 700 | 1,920 | 3,195 | 690 | 1,860 | 3,665 | 680 | 2,090 |

T represents tensil strength at break in pounds/sq. inch.
E represents elongation in per cent.
M represents modulus at 600% elongation.

The above example indicates the powerful activating effect of the process of this invention as shown in stocks B and D.

EXAMPLE II

The following example serves to indicate the unique effect of a composition prepared by treating a mixture of oleic and abietic acid with caustic soda, as contrasted to the sodium salts of the individual acids.

The materials were prepared as follows:

(a) Sodium abietate

Abietic acid (152 grams, 0.5 mol) was added to an aqueous solution containing 10 grams (0.25 mol) sodium hydroxide. When the reaction was complete, the water was removed by evaporation in an oven at 120° C. The product, a hard solid, was finely ground for use.

(b) Sodium oleate

Oleic acid (141 grams, 0.5 mol) was added to an aqueous solution containing 10 grams (0.25 mol) sodium hydroxide. When the reaction was complete, the water was removed by evaporation in an oven at 120° C. The product, a soft solid, was ready for use.

(c) Sodium salt of mixture oleic and abietic acid 10 grams (0.25 mol) sodium hydroxide in aqueous solution was added slowly with agitation, to a hot mixture of abietic acid (76 grams, 0.25 mol) and oleic acid (70.5 grams, 0.25 mol). When the reaction was complete the water was removed by evaporation in an oven at 120° C. The product, a soft brown solid was ready for use.

The following stocks were mixed, calendered and cured:

| Material | A | B | C | D |
|---|---|---|---|---|
| Rubber | 100 | 100 | 100 | 100 |
| Zinc Oxide | 10 | 10 | 10 | 10 |
| Sulphur | 3 | 3 | 3 | 3 |
| Mercaptobenzothiazole | 0.75 | 0.75 | 0.75 | 0.75 |
| Sodium abietate as prepared under (a) | 2 | | 1 | |
| Sodium oleate as prepared under (b) | | 2 | 1 | |
| Sodium salt of mixture oleic acid and abietic acid as prepared under (c) | | | | 2 |

On testing the cured slabs the following results were obtained. The cures were carried out at 30 lbs. per sq. inch steam pressure (274° F.).

| Cure | Stock A | | | Stock B | | | Stock C | | | Stock D | | |
|---|---|---|---|---|---|---|---|---|---|---|---|---|
| | T | E | M | T | E | M | T | E | M | T | E | M |
| 10x30# | 1,530 | 800 | 530 | 1,960 | 790 | 650 | 1,775 | 800 | 605 | 2,069 | 760 | 815 |
| 20x30# | 2,230 | 760 | 860 | 2,560 | 740 | 1,070 | 2,465 | 750 | 1,015 | 2,805 | 730 | 1,310 |
| 30x30# | 2,335 | 750 | 1,015 | 2,815 | 740 | 1,210 | 2,625 | 740 | 1,175 | 3,265 | 740 | 1,435 |
| 40x30# | 2,690 | 760 | 1,030 | 2,765 | 720 | 1,280 | 2,730 | 750 | 1,235 | 3,175 | 720 | 1,550 |
| 50x30# | 2,710 | 770 | 1,090 | 2,840 | 740 | 1,315 | 2,725 | 740 | 1,245 | 3,290 | 730 | 1,485 |

T represents tensile strength at break in pounds per sq. inch.
E represents elongation in per cent.
M represents modulus at 600% elongation.

An examination of the figures in the above table indicates the value of the invention described in this specification. The material prepared under (c) of this example is far more effective than either sodium abietate, sodium oleate or a mechanical mixture of these two materials. This indicates the scope of the invention but many modifications may be employed.

In the example given above, the sodium salt of the mixture of oleic and abietic acid was prepared by using a mixture of equal molecular quantities of the two acids. The process, however, is not limited by such a ratio of the two acids nor is it limited to the exact degree of neutralization shown in the example.

The aliphatic fatty acid and the resin acid may each be varied within limits so that each acid may comprise 20% to 80% of the total mixed acid; the degree of neutralization may be varied within the range of 5% to 100% of the total mixed acids.

I have found that a cheap and plentiful source of a mixture of aliphatic fatty and resin acids are oils known as tall oils. The tall oils vary in composition, the aliphatic fatty acids in different grades varying from 20% to 60% and the resin acids from 10% to 60%. The balance of the material consists of Sterols, higher alcohols and other constituents having little or no effect on the process of the invention. Such tall oils may be used as the raw material under this process or the aliphatic acids and the resin acid may be mechanically mixed prior to the formation of the alkaline metal salt.

The alkaline metal hydroxides may be added to the acid mixtures in the form of finely powdered material or as aqueous solutions. The mixture is then agitated with sufficient heating for the reaction to be completed. The water in the reaction product may be removed to any desired degree by any of the well known methods.

The reaction product may be controlled as regards physical characteristics from a viscous liquid to a hard solid and to all intermediate degrees, by the proper choice of the alkali employed. For example, when the neutralization is carried out with caustic soda, a solid is obtained; when the neutralization is carried out with caustic potash, a viscous liquid is obtained; intermediate viscosities to any desired degree may be obtained by carrying out the neutralization with the proper mixture of caustic soda and caustic potash.

EXAMPLE III

The following example serves to indicate the use of tall oil as a source of an acid mixture of aliphatic fatty and resin acids and shows the use of both the sodium and potassium salts in this process.

The materials were prepared as follows:

(a) *Sodium salt of tall oil*

Tall oil (560 grams) was treated with caustic soda (40 grams) at a temperature of 90° C., with agitation, until reaction was complete. The water was removed by evaporation at 120° C. The product was a semi-hard solid.

(b) *Potassium salt of tall oil*

Tall oil (560 grams) was treated with caustic potash (56 grams) at a temperature of 90° C., with agitation until reaction was complete. The water was removed by evaporation at 120° C. The product was a viscous liquid.

The following stocks were mixed, calendered and cured at 30 lbs. per sq. inch steam pressure (274° F.).

| Material | A | B | C | D | E |
|---|---|---|---|---|---|
| Rubber | 100 | 100 | 100 | 100 | 100 |
| Zinc Oxide | 10 | 10 | 10 | 10 | 10 |
| Sulphur | 3 | 3 | 3 | 3 | 3 |
| Mercaptobenzothiazole | 0.75 | 0.75 | 0.75 | 0.75 | 0.75 |
| Sodium abietate as prepared under Example II (a) | 2 | | 1 | | |
| Sodium oleate as prepared under Example II (b) | | 2 | 1 | | |
| Sodium salt of mixed acids as prepared from Tall Oil under Example III (a) | | | | 2 | |
| Potassium salt of mixed acids as prepared from Tall Oil under Example III (b) | | | | | 2 |

After curing at 30 lbs. per sq. inch steam pressure (274° F.), the following tensil strength results were obtained:

| Cure | Stock A | | | Stock B | | | Stock C | | | Stock D | | | Stock E | | |
|---|---|---|---|---|---|---|---|---|---|---|---|---|---|---|---|
| | T | E | M | T | E | M | T | E | M | T | E | M | T | E | M |
| 10x30# | 1,530 | 800 | 530 | 1,960 | 790 | 650 | 1,775 | 800 | 605 | 2,055 | 780 | 710 | 2,060 | 760 | 815 |
| 20x30# | 2,230 | 760 | 865 | 2,560 | 740 | 1,070 | 2,465 | 750 | 1,015 | 2,705 | 730 | 1,245 | 2,805 | 730 | 1,310 |
| 30x30# | 2,335 | 750 | 1,015 | 2,815 | 740 | 1,210 | 2,625 | 740 | 1,175 | 3,005 | 730 | 1,430 | 3,265 | 740 | 1,435 |
| 40x30# | 2,690 | 760 | 1,030 | 2,765 | 720 | 1,280 | 2,905 | 750 | 1,235 | 3,370 | 740 | 1,420 | 3,275 | 720 | 1,550 |
| 50x30# | 2,710 | 770 | 1,090 | 2,840 | 740 | 1,315 | 2,725 | 740 | 1,245 | 3,210 | 730 | 1,500 | 3,290 | 730 | 1,485 |

T represents tensil strength at break in pounds per sq. inch.
E represents elongation in per cent.
M represents modulus at 600% elongation.

The above examples serve to indicate how the invention may be utilized. The new compositions may be added to any of the rubber recipes normally employed in the industry in an amount which may be determined according to the usual methods. In general, the quantity of the alkaline metal salt may vary from 0.5% to 10.0%; these limits are very flexible and the quantity to be used is dependent upon the results desired. Where the word "rubber" is used in the specification and appended claims, it is intended to mean elastomers of both the natural and synthetic varieties.

Some of the "activator" and accelerator combinations referred to above possess the additional characteristic of causing more uniform vulcanization.

Having described my invention, what I claim is:

1. A rubber composition containing sulphur including an organic accelerator of vulcanization and from about 0.5% to about 10% of an alkaline metal salt of tall oil.

2. A rubber composition containing sulphur including an organic accelerator of vulcanization and from about 0.5% to about 10% of the product produced by adding to tall oil caustic alkali in an amount not more than sufficient to neutralize the tall oil.

3. A rubber composition containing sulphur including an organic accelerator of vulcanization and from about 0.5% to about 10% of the sodium salt of tall oil.

4. A rubber composition containing sulphur including an organic accelerator of vulcanization and from about 0.5% to about 10% of the product produced by adding to tall oil caustic soda in an amount not more than sufficient to neutralize the tall oil.

5. A vulcanizable rubber composition containing sulphur, an organic accelerator of vulcanization and from about 0.5% to about 10% of an alkali metal salt composition formed by reacting a mixture of an aliphatic acid and a resin acid of the formula $C_{20}H_{30}O_2$ with caustic alkali, the resultant salt composition promoting the action of the organic accelerator in vulcanization, the activating property of the resultant salt composition being substantially greater than the additive activating effect of a mixture of separately formed alkali metal salts of the same aliphatic and resin acids or of the activating effect of the same alkali metal salts when used separately.

6. The rubber composition of claim 5, the aliphatic acid being selected from the group consisting of acetic, oleic, ethyl hexoic, stearic, lauric, palmitic, glycolic, adipic, maleic and citric acids and the resin acid being selected from the group consisting of abietic and pimaric acids.

7. The rubber composition of claim 5, the alkali metal salt composition being a sodium salt and the caustic alkali being sodium hydrate.

8. The rubber composition of claim 5, in which the added caustic alkali is only sufficient to neutralize the acid mixture.

9. A rubber composition containing sulphur, including an organic accelerator of vulcanization and, as an activator of said accelerator, about 0.5% to about 10% of the reaction product of caustic alkali with a mixture consisting essentially of aliphatic mono-basic acid and abietic acid.

10. A rubber composition containing sulphur, including an organic accelerator of vulcanization and, as an activator of said accelerator, about 0.5% to about 10% of the reaction product of caustic alkali with a mixture consisting essentially of acids one of which is abietic acid and the balance being aliphatic mono-basic acids.

11. A rubber composition according to claim 10 in which said aliphatic mono-basic acids have from 12 to 18 carbon atoms in their structures.

ERVIN R. WILLIAMS.

REFERENCES CITED

The following references are of record in the file of this patent:

UNITED STATES PATENTS

| Number | Name | Date |
|---|---|---|
| 1,893,869 | Morton | Jan. 10, 1933 |
| 2,131,126 | Horst | Sept. 27, 1938 |
| 2,402,473 | Van Zile | June 18, 1946 |
| 2,457,335 | Williams et al. | Dec. 28, 1948 |

OTHER REFERENCES

"Paint Techonology" of August 1946, pp. 302–304.